US 9,535,460 B2

(12) United States Patent
Jheng et al.

(10) Patent No.: US 9,535,460 B2
(45) Date of Patent: Jan. 3, 2017

(54) ELECTRONIC DEVICE WITH EASY ASSEMBLY FUNCTION AND RELATED COMPUTER SYSTEM

(71) Applicant: Wistron Corporation, New Taipei (TW)

(72) Inventors: Shan-Wei Jheng, New Taipei (TW);
Yu-Sheng Lin, New Taipei (TW);
Chih-Kun Yao, New Taipei (TW);
Yin-Li Wang, New Taipei (TW);
Tien-Chuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 152 days.

(21) Appl. No.: 14/142,908

(22) Filed: Dec. 29, 2013

(65) Prior Publication Data

US 2015/0070823 A1 Mar. 12, 2015

(30) Foreign Application Priority Data

Sep. 10, 2013 (TW) .............................. 102217015 U (51) Int. Cl.
*G06F 1/16* (2006.01)

(52) U.S. Cl.
CPC ........... *G06F 1/1643* (2013.01); *G06F 1/1616* (2013.01)

(58) Field of Classification Search
CPC G02F 1/133308; G06F 1/1616; G06F 1/1686; G03B 17/00
USPC ............. 349/60, 58; 345/207; 396/428, 429; 361/679.21; 473/307
See application file for complete search history.

(56) References Cited

U.S. PATENT DOCUMENTS

| 7,324,173 | B2* | 1/2008 | Li ..................... G02F 1/133308 349/58 |
| 7,412,163 | B2* | 8/2008 | Wu ........................ G03B 17/00 16/221 |
| 7,609,529 | B2 | 10/2009 | Chiang |
| 7,847,879 | B2* | 12/2010 | Choi ................. G02F 1/133308 349/58 |
| 8,641,302 | B2* | 2/2014 | Kao ....................... G06F 1/1686 396/428 |
| 9,007,352 | B2* | 4/2015 | Senatori ................ G06F 1/1686 345/166 |
| 2009/0190062 | A1* | 7/2009 | Sudo ................. G02F 1/133308 349/58 |
| 2012/0013584 | A1* | 1/2012 | Senatori ................ G06F 1/1686 345/207 |

* cited by examiner

*Primary Examiner* — Eric Thomas
*Assistant Examiner* — Michael P McFadden
(74) *Attorney, Agent, or Firm* — Winston Hsu; Scott Margo (57) ABSTRACT

An electronic device with easy assembly function is disclosed in the present invention. The electronic device includes a bezel, a display panel and a fixing component. The bezel includes a first engaging portion and a first wedging portion, respectively disposed on different sides of the bezel. The display panel is disposed on the bezel and adjacent to the first engaging portion and the first wedging portion. The fixing component includes a body, a second engaging portion and a second wedging portion. The body presses the display panel. The second engaging portion protrudes from the body and is detachably engaged with the first engaging portion. The second wedging portion protrudes from a position of the body different from the second engaging portion, and is detachably wedged with the first wedging portion.

20 Claims, 10 Drawing Sheets

ELECTRONIC DEVICE WITH EASY ASSEMBLY FUNCTION AND RELATED COMPUTER SYSTEM

BACKGROUND OF THE INVENTION

1. Field of the Invention

The present invention relates to an electronic device with a touch panel, and more particularly, to a touch electronic device and a related computer system with easy assembly function.

2. Description of the Prior Art

With the advanced technology, the tablet computer and the notebook computer generally include the touch screen for convenient utility. The conventional notebook computer or the conventional tablet computer disposes the touch panel on the base by screw locking or the engaging mechanism, then the bezel is disposed on the base, and the touch panel can be partially exposed via the opening of the bezel. Screen assembly of the notebook computer and the tablet computer is completed and illustrated as above. In the conventional assembly procedure, the touch panel is disposed on the base before the bezel is installed on the touch panel and the base, which results in weak structural strength between the bezel and the touch panel. The touch panel may be easily separated from the bezel by overloading applied to the screen. In addition, assembly mechanism of the conventional screen is complicated and inconvenient to repair. Design of a touch panel module with easy assembly function and great structural strength is an important issue in the related computer industry.

SUMMARY OF THE INVENTION

The present invention provides a touch electronic device and a related computer system with easy assembly function for solving above drawbacks.

According to the claimed invention, an electronic device with easy assembly function includes a bezel, a display panel and a fixing component. The bezel includes a first engaging portion and a first wedging portion respectively disposed on different sides of the bezel. The display panel is disposed on the bezel and adjacent to the first engaging portion and the first wedging portion. The fixing component includes a body, a second engaging portion and a second wedging portion. The body presses the display panel. The second engaging portion protrudes from the body and is detachably engaged with the first engaging portion. The second wedging portion protrudes from a position of the body different from the second engaging portion and is detachably wedged with the first wedging portion.

According to the claimed invention, the first engaging portion is a sunken slot, and the second engaging portion is a protrusion. The protrusion is rotatably or movably engaged with the sunken slot.

According to the claimed invention, the first wedging portion includes a hook and a block, and the second wedging portion includes two open hole structures. The hook is wedged with the corresponding open hole structure to constrain a movement of the body relative to the bezel at a first direction. The block is wedged with the other open hole structure to constrain a movement of the body relative to the bezel at a second direction. The second direction is different from the first direction.

According to the claimed invention, the first wedging portion is a slide slot, and the second wedging portion is a board structure. The board structure slidably inserts into the slide slot to constrain a movement of the body relative to the bezel at a first direction.

According to the claimed invention, the body is a single curved structure with a first part and a second part connected to each other. The first part is bent from the second part. The first part and the second part respectively press adjacent edges of the display panel. The second engaging portion is disposed on the first part, and the second wedging portion is disposed on the second part.

According to the claimed invention, the fixing component further includes a first lock hole structure disposed on the body. A first external fixing unit is utilized to fix the first lock hole structure on the bezel.

According to the claimed invention, the body is a dual curved structure with a first part, a second part and a third part respectively pressing corresponding edges of the display panel. The second part and the third part are respectively bent from two ends of the first part. The second engaging portion is disposed on the first part, the second wedging portion is disposed on the second part, and the first lock hole structure is disposed on the third part.

According to the claimed invention, the bezel further includes at least one first constraining portion, the electronic device further includes a base, and the base includes at least one second constraining portion. The first constraining portion slidably inserts into the second constraining portion to assemble the bezel with the base.

According to the claimed invention, the fixing component further includes a second lock hole structure disposed on the body. A second external fixing unit is utilized to fix the second lock hole structure on the base.

According to the claimed invention, the electronic device further includes a camera module, and the bezel further includes at least two buckling portions buckled with opposite sides of the camera module. The bezel further includes at least two positioning portions respectively inserting into corresponding holes on the camera module, and an inclined structure is formed on a top of the positioning portion.

According to the claimed invention, a computer system includes an input module and an electronic device. The electronic device is electrically connected to the input module in a pivotal manner to receive an input signal from the input module. The electronic device includes a bezel, a display panel and a fixing component. The bezel includes a first engaging portion and a first wedging portion respectively disposed on different sides of the bezel. The display panel is disposed on the bezel and adjacent to the first engaging portion and the first wedging portion. The fixing component includes a body, a second engaging portion and a second wedging portion. The body presses the display panel. The second engaging portion protrudes from the body and is detachably engaged with the first engaging portion. The second wedging portion protrudes from a position of the body different from the second engaging portion and is detachably wedged with the first wedging portion.

The present invention utilizes the curved fixing component to press the display panel, and the curved fixing component is disposed on the bezel by structural engagement or screw locking. Therefore, the fixing component and the adhesive component can stably assemble the display panel with the bezel to increase structural intensity. The electronic device of the present invention has advantages of low assembly hours, easy assembly/disassembly function and convenient repair.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
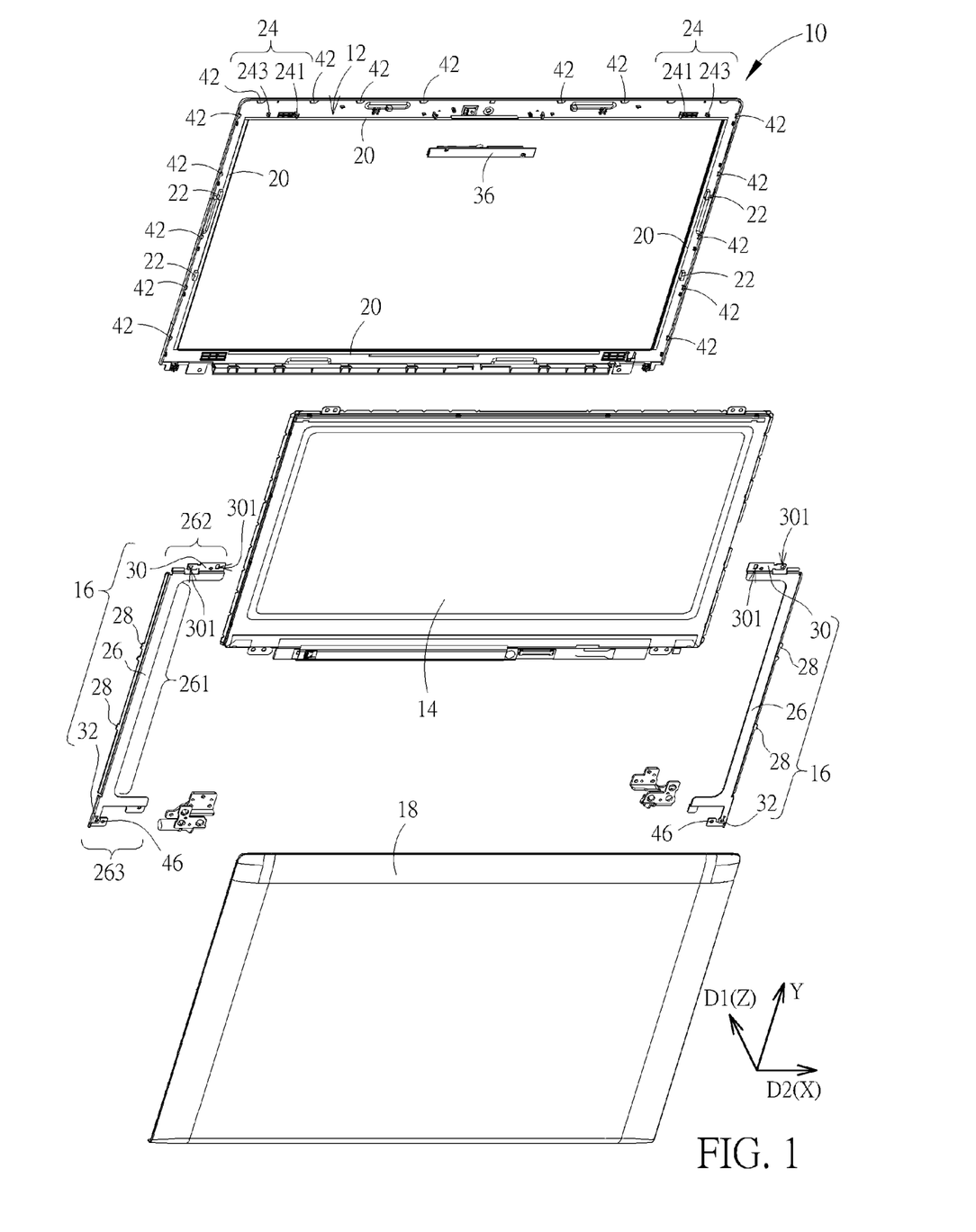
FIG. 1 is an exploded diagram of an electronic device according to an embodiment of the present invention.
Figure 2:
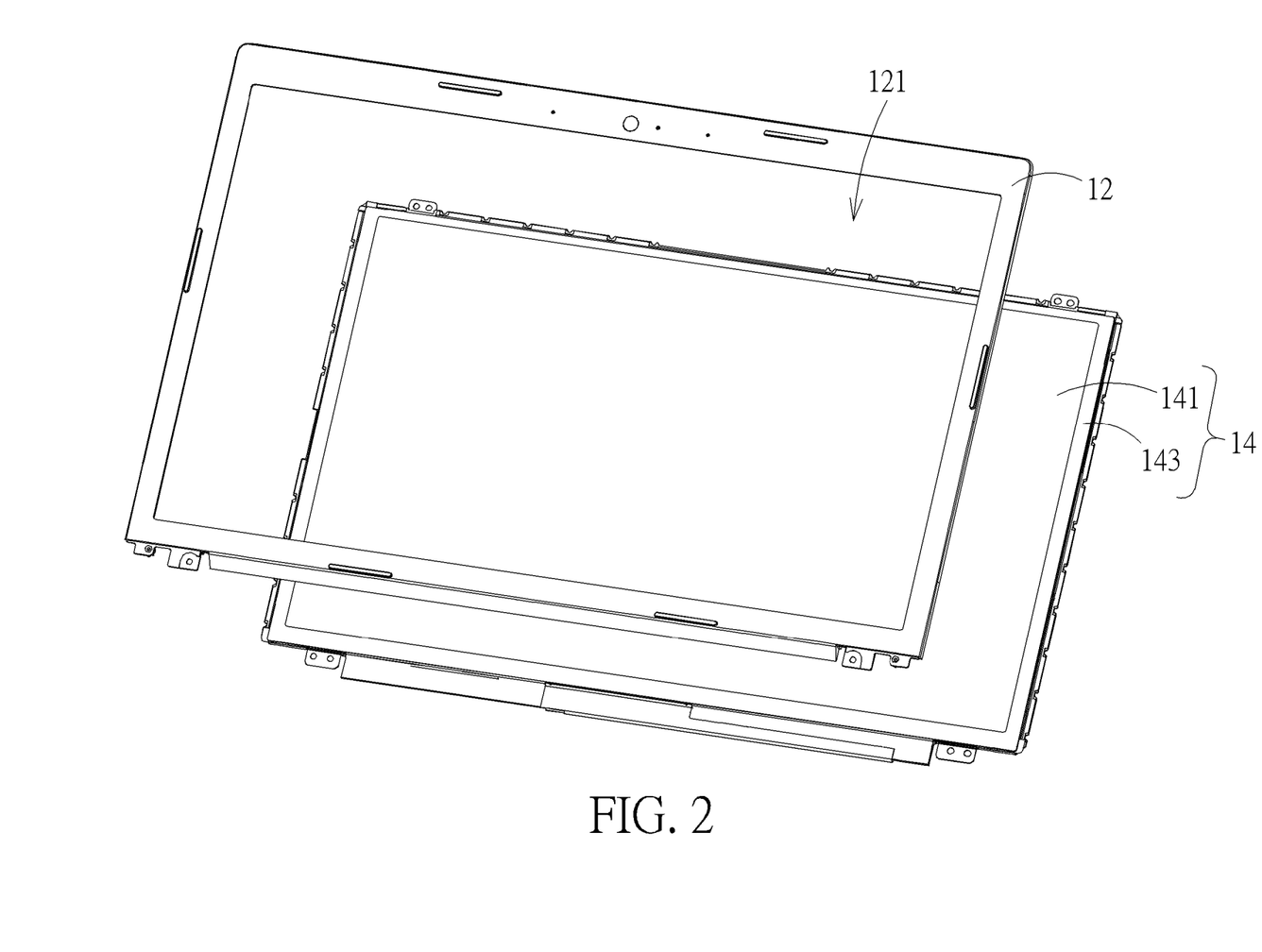
FIG. 2 is a diagram of a bezel and a display panel in the other view according to the embodiment of the present invention.

Please refer to FIG. 1. FIG. 1 is an exploded diagram of an electronic device 10 according to an embodiment of the present invention. The electronic device 10 provides advantages of easy assembly/disassembly function and convenient repair. The electronic device 10 includes a bezel 12, a display panel 14, at least one fixing component 16 and a base 18. A plurality of adhesive components 20 is disposed on each side of the bezel 12. Please refer to FIG. 2. FIG. 2 is a diagram of the bezel 12 and the display panel 14 in the other view according to the embodiment of the present invention. The display panel 14 includes a panel unit 141 and a supporter 143. An opening 121 is formed on the bezel 12. The bezel 12 is disposed on the supporter 143 by the adhesive components 20, and the panel unit 141 aligns with the opening 121 to be exposed.

The adhesive component 20 can be made of sponge or any material with resilience. The adhesive component 20 is compressive to absorb vibration of the display panel 14 when the display panel 14 is pressed by external force. The present invention utilizes the adhesive component 20 to dispose the display panel 14 on the bezel 12, to effectively maintain an interval between the bezel 12 and the display panel 14. A thickness of the adhesive component 20 corresponds to structural height difference between the bezel 12 and the display panel 14.

Figure 3:
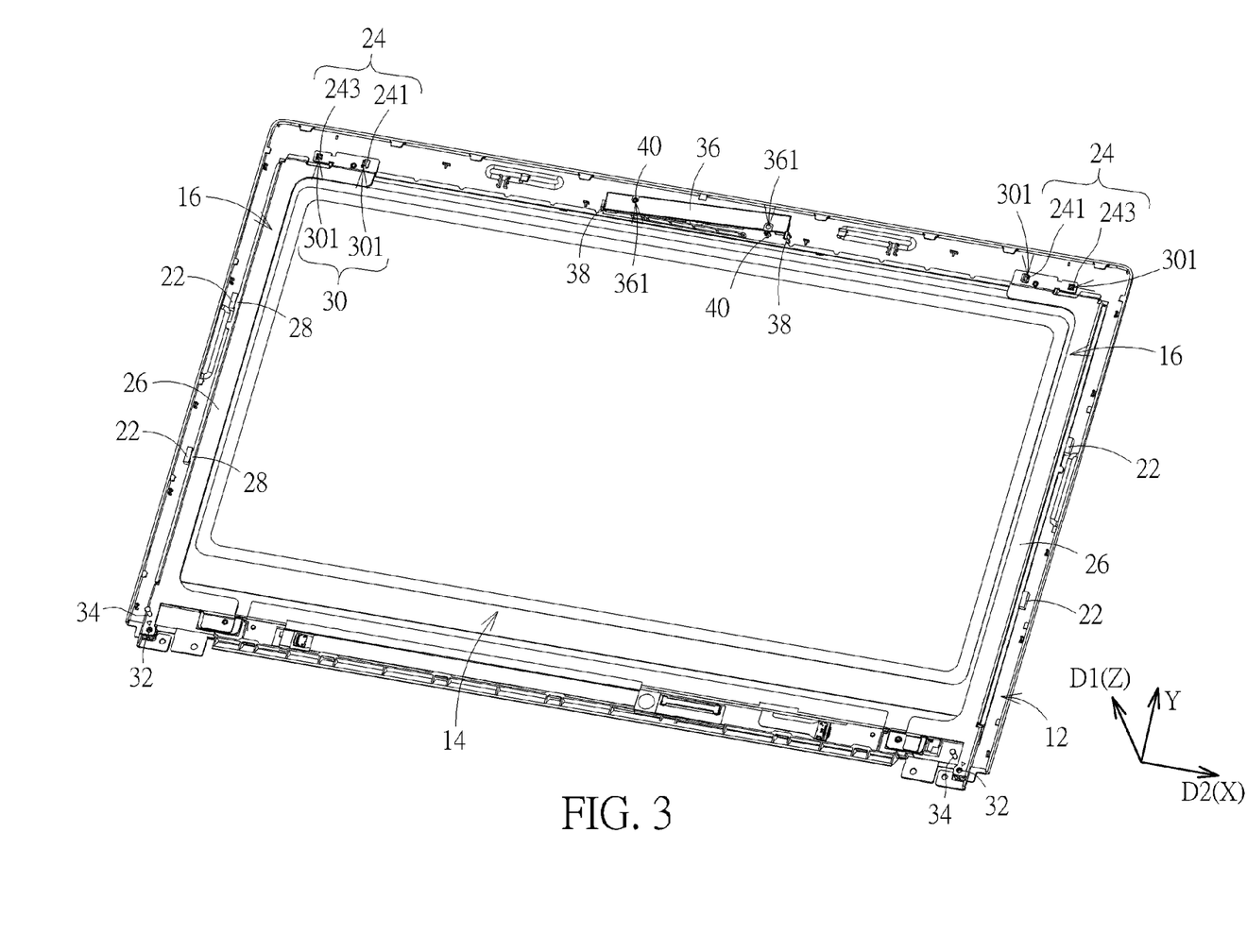
FIG. 3 is an assembly diagram of the bezel, the display panel and a fixing component according to a first embodiment of the present invention.

Please refer to FIG. 1 and FIG. 3. FIG. 3 is an assembly diagram of the bezel 12, the display panel 14 and the fixing component 16 according to a first embodiment of the present invention. As shown in FIG. 1, the bezel 12 includes a plurality of first engaging portions 22 and a plurality of first wedging portions 24, respectively disposed around the opening 121 and located on different sides of the bezel 12. The display panel 14 can be adjacent to or contact against the first engaging portion 22 and the first wedging portion 24 when the display panel 14 is disposed on the bezel 12. The first embodiment includes two fixing components 16 respectively disposed on opposite sides of the display panel 14. Each fixing component 16 includes a body 26, a plurality of second engaging portions 28 and a plurality of second wedging portions 30. The body 26 is a curved structure adapted to press at least one or more edges of the display panel 14, so as to prevent the bezel 12 and the display panel 14 from separation when the adhesive component 20 becomes invalid by overloading. The second engaging portion 28 and the second wedging portion 30 respectively protrude from different positions of the body 26, and are respectively assembled with the first engaging portion 22 and the first wedging portion 24 in a detachable manner.

In the first embodiment, the first engaging portion 22 can be a sunken slot, and the second engaging portion 28 can be a protrusion. The protrusion is rotatably or movably engaged with the sunken slot by predetermined structural tolerance. The first wedging portion 24 can include a hook 241 and a block 243. The second wedging portion 30 can include two open hole structures 301. The hook 241 is wedged with one of the open hole structures 301 to constrain a movement of the body 26 relative to the bezel 12 at a first direction D1 (Z-axis). The block 243 is wedged with the other open hole structure 301 to constrain a movement of the body 26 relative to the bezel 12 at a second direction D2 (X-axis). The second direction D2 is substantially perpendicular to the first direction D1.

Preferred assembly procedure of the first embodiment is illustrated as following. The second engaging portion 28 of the fixing component 16 obliquely inserts into the first engaging portion 22 when the body 26 does not press the display panel 14. Then, the fixing component 16 rotates via an assembly point of the first engaging portion 22 and the second engaging portion 28 to downwardly move the body 26, and the second wedging portion 30 contacts the first wedging portion 24. In the meantime, external force is applied to the fixing component 16 to wedge the hook 241 and the block 243 with the open hole structures 301, so as to contact the body 26 against the display panel 14. The fixing component 16 further includes a first lock hole structure 32 disposed on the body 26 to constrain position of the fixing component 16. A first external fixing unit 34 of the electronic device 10 is utilized to fix the first lock hole structure 32 on the bezel 12, and the body 26 can stably press over the display panel 14.

Figure 4:
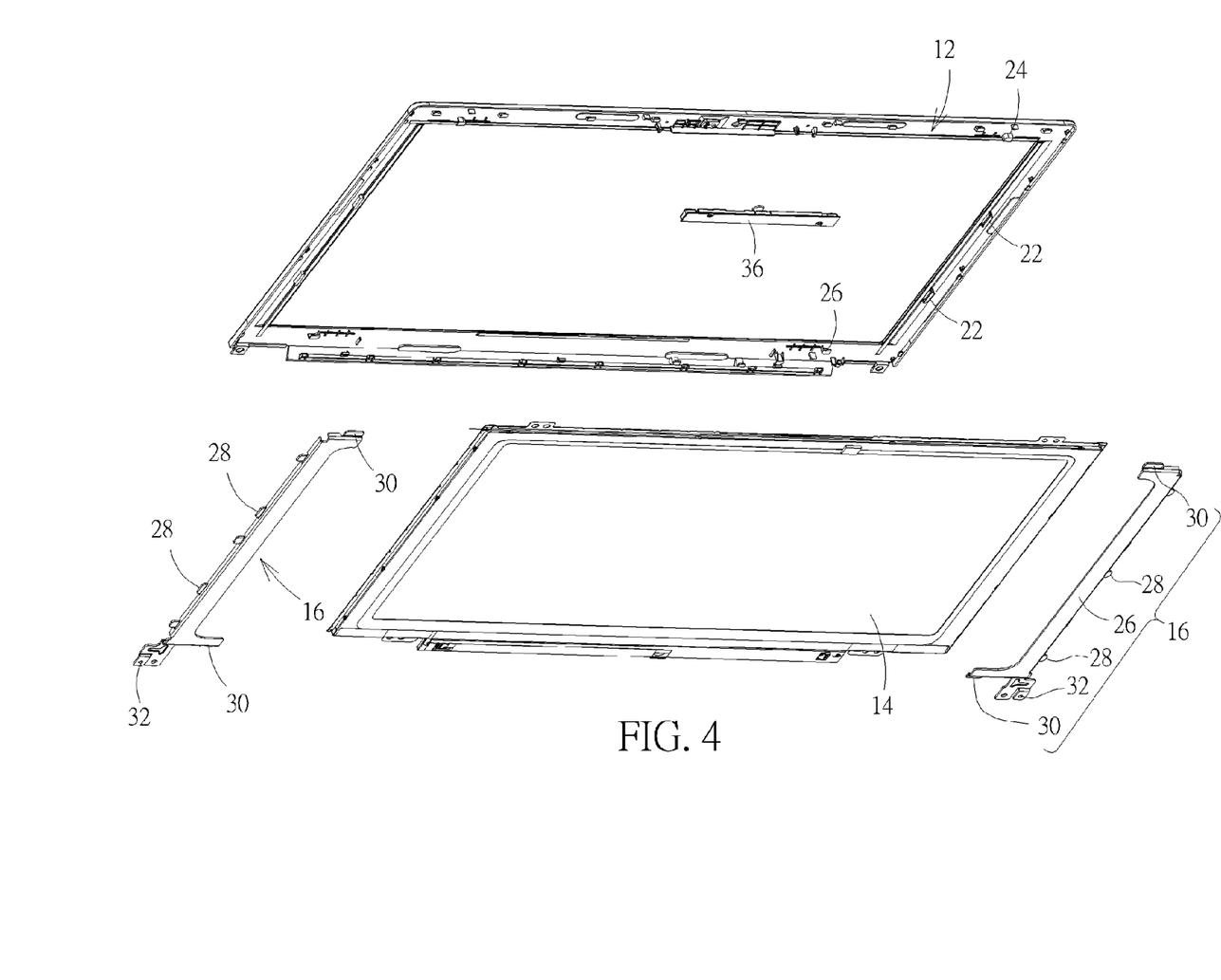
FIG. 4 is an exploded diagram of the bezel, the display panel and the fixing component according to a second embodiment of the present invention.
Figure 5:
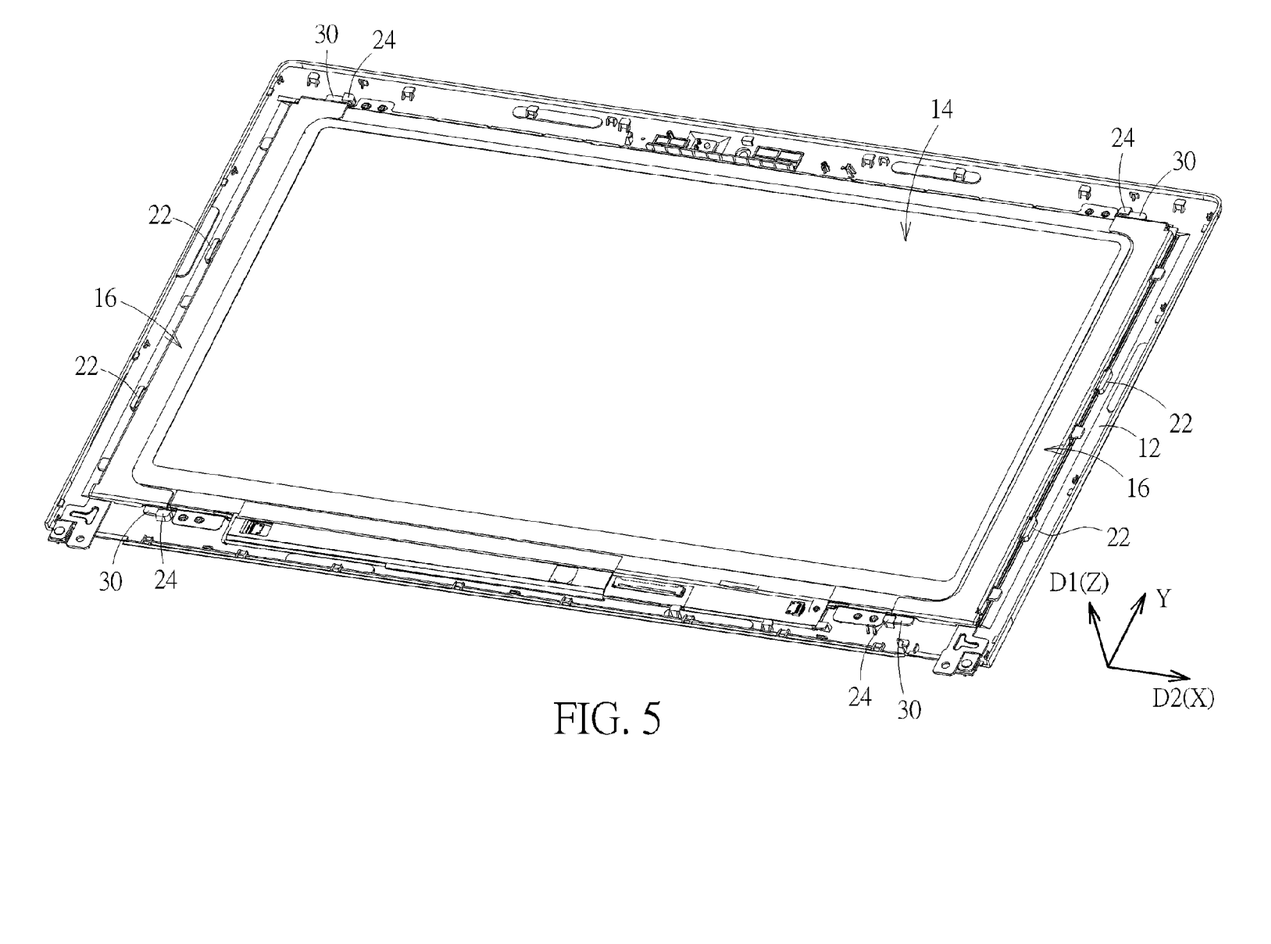
FIG. 5 is an assembly diagram of the bezel, the display panel and the fixing component according to the second embodiment of the present invention.

Please refer to FIG. 4 and FIG. 5. FIG. 4 is an exploded diagram of the bezel 12, the display panel 14 and the fixing component 16 according to a second embodiment of the present invention. FIG. 5 is an assembly diagram of the bezel 12, the display panel 14 and the fixing component 16 according to the second embodiment of the present invention. Difference between the second embodiment and the first embodiment is that the first wedging portion 24 of the bezel 12 in the second embodiment is a slide slot, and the second wedging portion 30 of the fixing component 16 is a board structure. The board structure slidably inserts into the slide slot to constrain the movement of the body 26 relative to the bezel 12 at the first direction D1. In the second embodiment, elements having the same numeral have the same structure and function as ones of the first embodiment, and the detailed description is omitted herein for simplicity.

Preferred assembly procedure of the second embodiment is illustrated as following. The second wedging portion 30 slidably inserts into the first wedging portion 24, the external force is applied to the fixing component 16 to generate structural deformation, and the second engaging portion 28 is engaged with the first engaging portion 22. An external fixing unit (not shown in figures) is utilized to fix the first lock hole structure 32 on the bezel 12. Thus, the fixing component 16 can press the display panel 14 and the display panel 14 is stably disposed on the bezel 12. The assembly procedures of the first embodiment and the second embodiment are not limited to the above-mentioned illustration, and depend on actual demand.

In the first embodiment, the body 26 of the fixing component 16 is a dual curved structure (U-shaped structure) which includes a first part 261, a second part 262 and a third part 263. The second part 262 and the third part 263 are respectively bent from two ends of the first part 261, as shown in FIG. 1. The second engaging portion 28 is disposed on the first part 261, the second wedging portion 30 is disposed on the second part 262, and the first lock hole structure 32 is disposed on the third part 263. The first part 261, the second part 262 and the third part 263 of the body 26 respectively press three edges of the display panel 14 to provide uniform pressure.

Besides, the body 26 further can be a single curved structure (L-shaped structure) which merely includes the first part 261 and the second part 262 connected to each other. The first part 261 and the second part 262 of the signal curved structure respectively press adjacent edges of the display panel 14. The electronic device 10 includes two fixing components 16 respectively disposed on the opposite sides of the display panel 14, and each fixing component 16 presses at least two edges of the display panel 14. The fixing component 16 capable of providing uniform pressure on the display panel 14, including the single curved structure or the dual curved structure, belongs to scope of the present invention, and related application is varied according to design demand.

As shown in FIG. 3, the electronic device 10 further includes a camera module 36, and the bezel 12 further includes at least two buckling portions 38 and at least two positioning portions 40. The positioning portions 40 can respectively insert into corresponding holes 361 formed on the camera module 36, and the buckling portions 38 can be accurately buckled with opposite sides of the camera module 36. For assembly of the camera module 36, one of the holes 361 (the left-side hole) is disposed on the corresponding positioning portion 40, to buckle a side (the left side) of the camera module 36 with the left buckling portion 38. Then, the other side (the right side) of the camera module 36 is pushed toward the right buckling portion 38, so the other hole 361 (the right-side hole) of the camera module 36 can be disposed on the corresponding positioning portion 40, and the right buckling portion 38 is buckled with the camera module 36 by recovery property of the structural deformation of the camera module 36. An inclined structure can be preferably formed on a top of at least one positioning portion 40 (such as the right positioning portion). The hole 361 on the camera module 36 can be smoothly sheathed on the positioning portion 40 via the inclined structure, and the camera module 36 is conveniently installed on the bezel 12.

In the other assembly procedure, the camera module 36 can be moved to a position where the holes 361 are respectively sheathed on the positioning portions 40 of the bezel 12. Then, the external force is applied to the sides of the camera module 36, to buckle the right side and the left side of the camera module 36 with the buckling portions 38 of the bezel 12, so as to constrain the movement of the camera module 36 relative to the bezel 12. The assembly procedures of the camera module 36 and the bezel 12 are not limited to the above-mentioned embodiments, which depend on actual demand, and the detailed description is omitted herein for simplicity.

Figure 6:
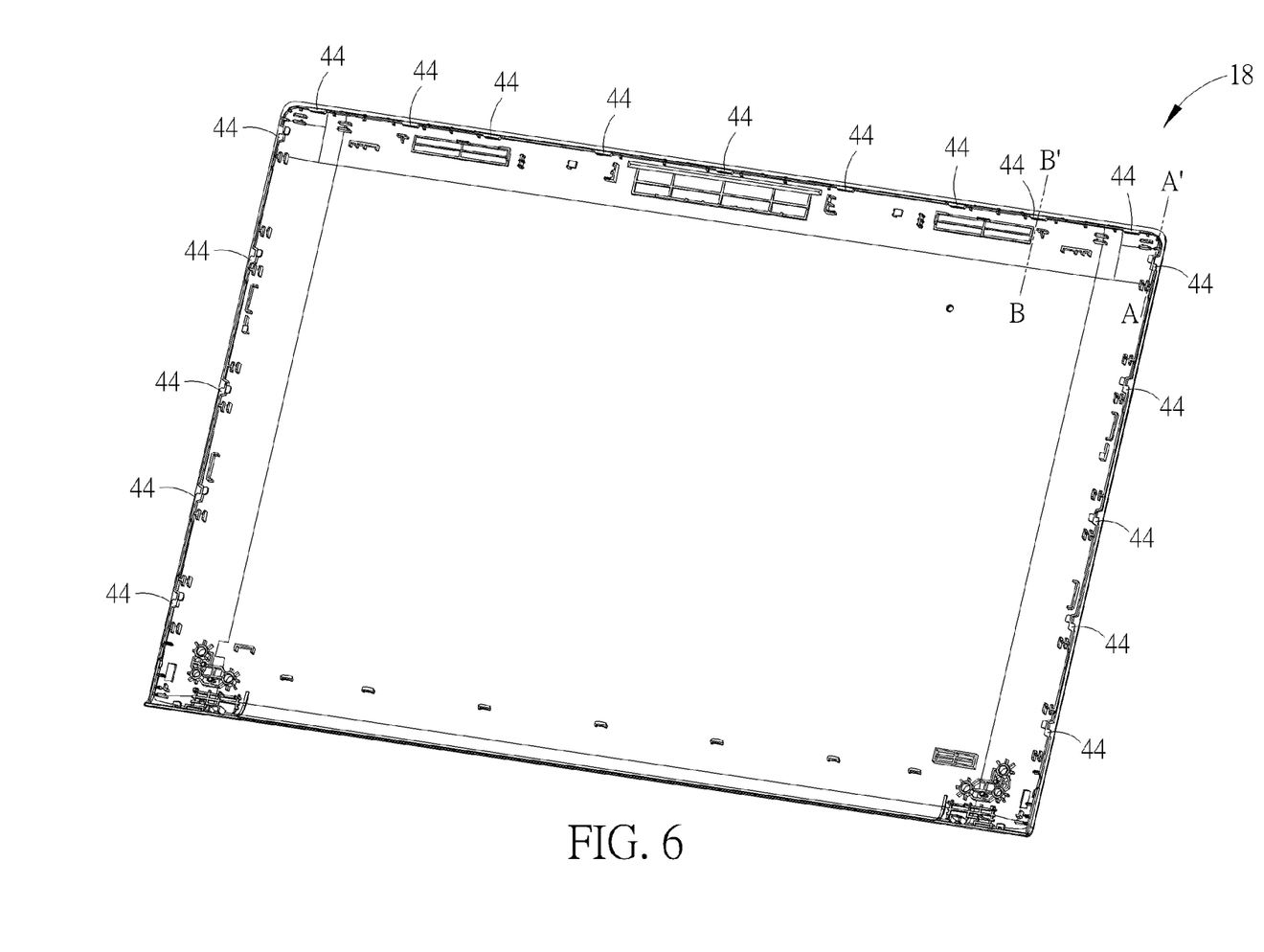
FIG. 6 is a diagram of a base in the other view according to the embodiment of the present invention.
Figure 7:
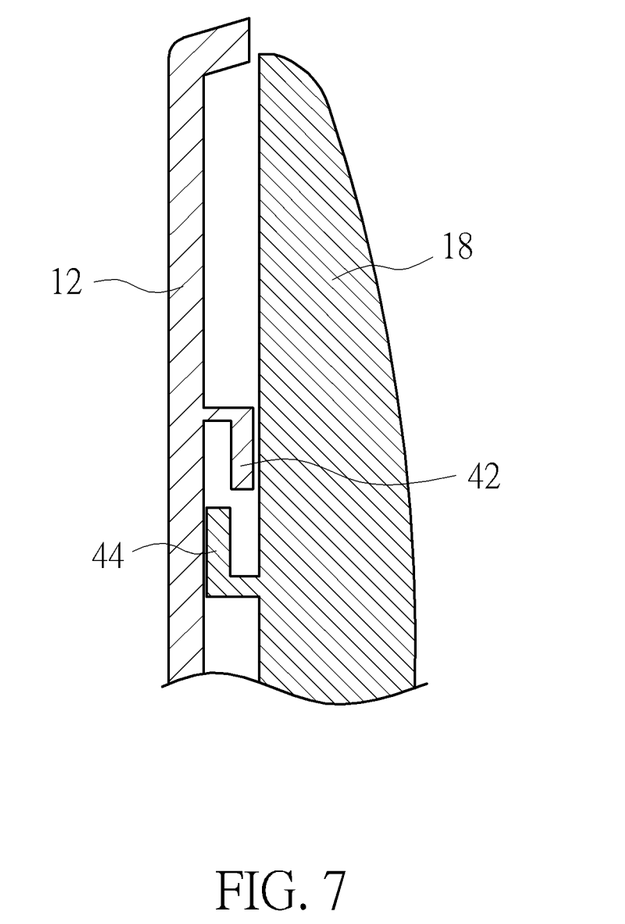
FIG. 7 is a sectional view of the bezel and the base along lines A-A' in FIG. 6.
Figure 8:
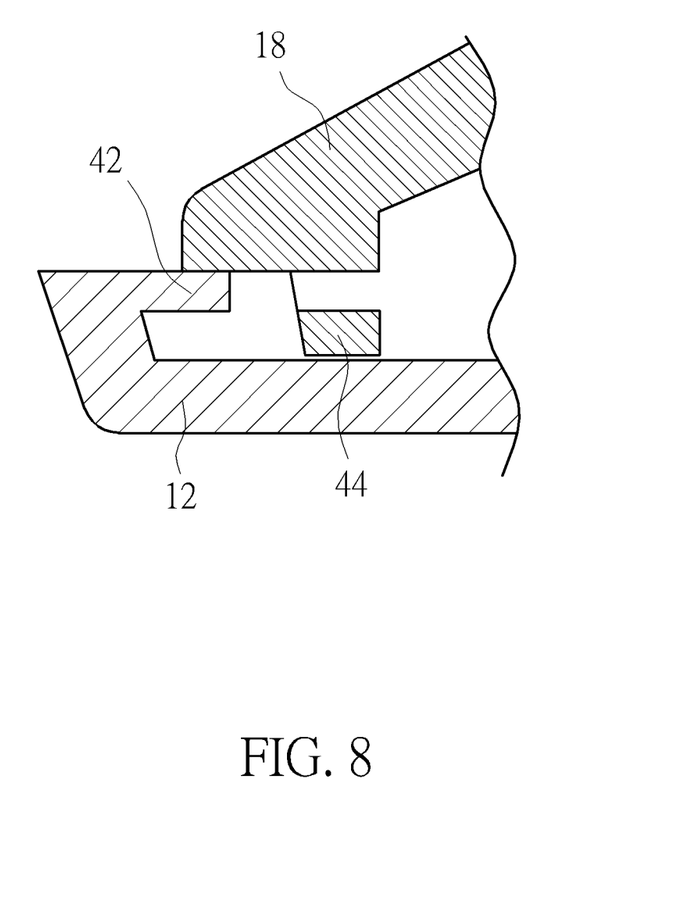
FIG. 8 is a sectional view of the bezel and the base along lines B-B' in FIG. 6.

Please refer to FIG. 1 and FIG. 6. FIG. 6 is a diagram of the base 18 in the other view according to the embodiment of the present invention. The bezel 12 further includes a plurality of constraining portions 42 respectively disposed on three sides of the bezel 12. The base 18 includes a plurality of second constraining portions 44 respectively disposed on three sides of the base 18. Amount and position of the second constraining portion 44 correspond to amount and position of the first constraining portion 42. Please refer to FIG. 7 and FIG. 8. FIG. 7 is a sectional view of the bezel 12 and the base 18 along lines A-A' in FIG. 6. FIG. 8 is a sectional view of the bezel 12 and the base 18 along lines B-B' in FIG. 6. As shown in FIG. 7 and FIG. 8, when the bezel 12 is slidably disposed on the base 18, the plurality of first constraining portions 42 of the bezel 12 can insert into the corresponding second constraining portions 44 of the base 18, so as to constrain the movement of the bezel 12 relative to the base 18 at the first direction D1.

Figure 9:
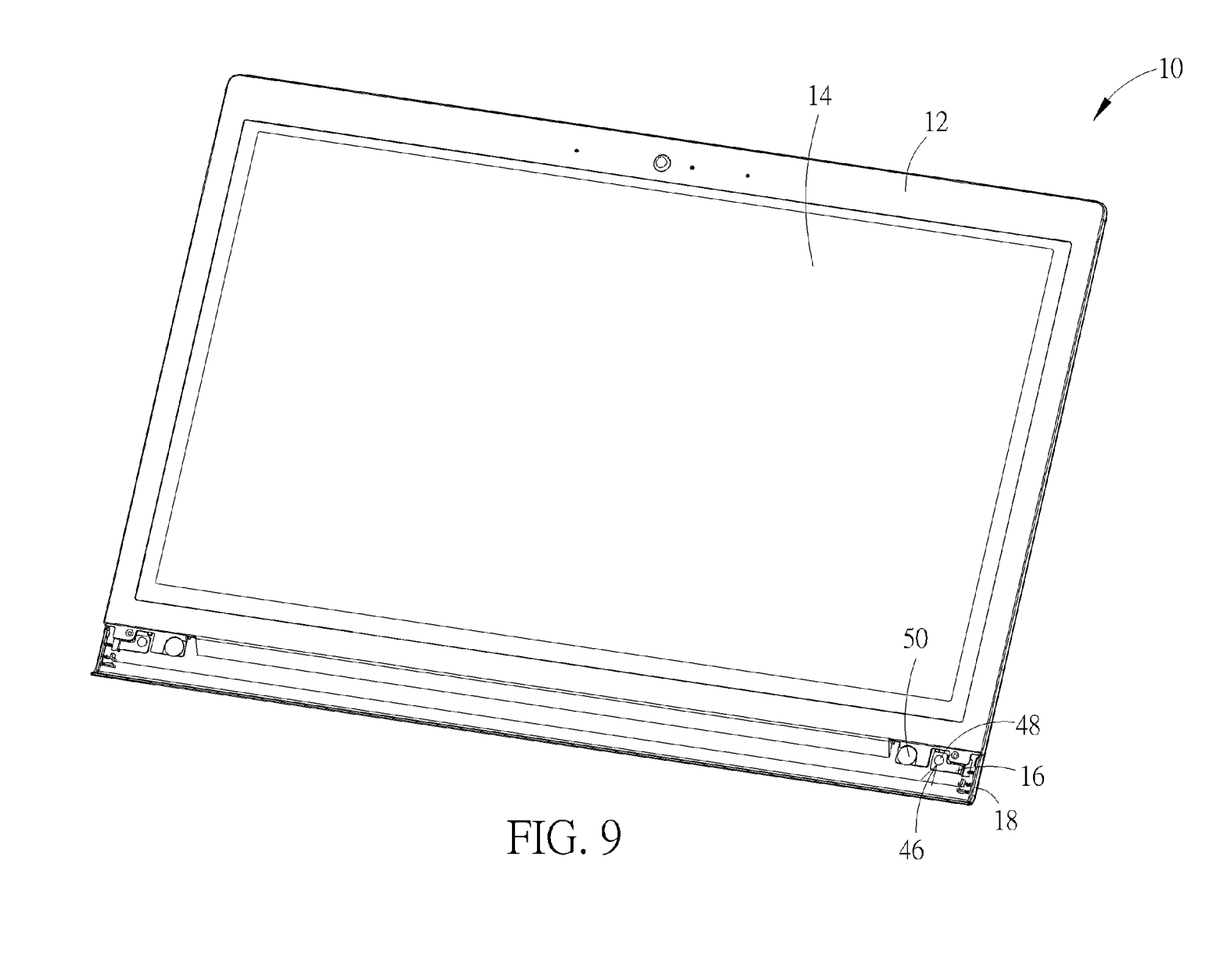
FIG. 9 is an assembly diagram of the bezel, the display panel and the base according to the embodiment of the present invention.

Please refer to FIG. 1 and FIG. 9. FIG. 9 is an assembly diagram of the bezel 12, the display panel 14 and the base 18 according to the embodiment of the present invention. The fixing component 16 further can include a second lock hole structure 46 disposed on the body 26. The bezel 12 with the display panel 14 is assembled with the base 18 in a slidable engaging manner. A second external fixing unit 48 of the electronic device 10 is utilized to fix the second lock hole structure 40 on the base 18. In addition, a third external fixing unit 50 of the electronic device 10 can be utilized to pass through the bezel 12 and install on the base 18, so as to enhance structural stability. A decorative component can be disposed on a low side of the electronic device 10 to cover the external fixing unit and the fixing component for aesthetic. In the preferred embodiment of the present invention, the display panel 14 of the electronic device 10 is the touch panel, and the touch panel is disposed between the bezel 12 and the base 18 by the fixing component 16. The electronic device 10 can be the tablet computer with the touch panel.

Figure 10:
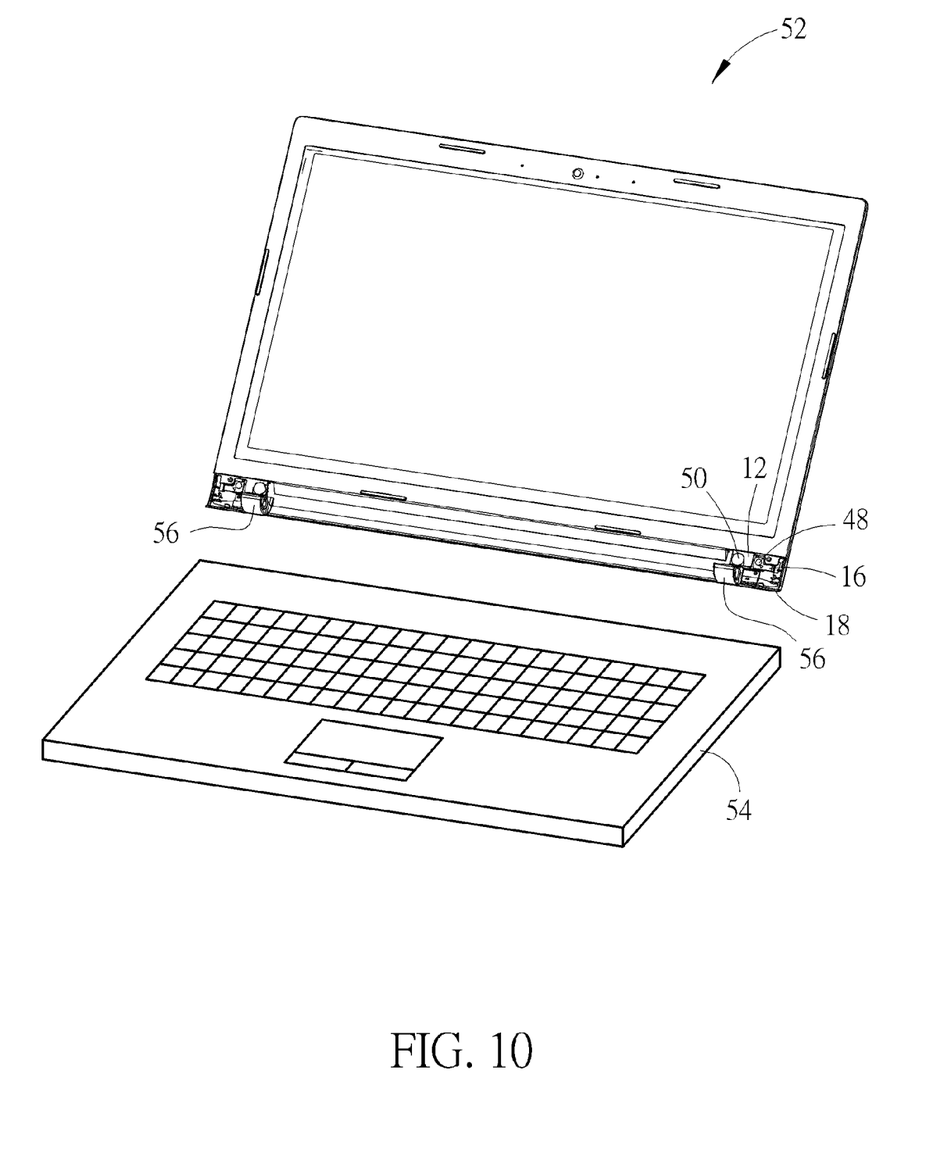
FIG. 10 is a diagram of a computer system according to the embodiment of the present invention.

The electronic device 10 further can be electrically connected to the input module to form the computer system. Please refer to FIG. 10. FIG. 10 is a diagram of a computer system 52 according to the embodiment of the present invention. The computer system 52 includes an input module 54 and the electronic device 10. The electronic device 10 is the touch screen, the input module 54 is the keyboard device, and the computer system 52 is the notebook computer. The electronic device 10 further can include a plurality of pivot mechanisms 56 electrically connected to the input module 54 in a pivotal manner to receive the input signal from the input module 54. As shown in FIG. 10, the second external fixing unit 48 passes through the fixing component 16 and the pivot mechanism 56 to lock on the base 18, the third external fixing unit 50 passes through the bezel 12 and the pivot mechanism 56 to lock on the base 18, and the pivot mechanism 56 can be stably installed inside the electronic device 10. The external fixing units are removed to rapidly separate the bezel 12, the display panel 14 and the base 18 for disassembly of the electronic device 10.

In conclusion, the present invention disposes the display panel on the bezel via the adhesive component, to ensure that the panel unit of the display panel accurately aligns with the opening on the bezel, and to prevent the panel unit (which is made of glass material) from break by pressure of the bezel. The present invention further utilizes the curved fixing component to press the display panel, and the curved fixing component is disposed on the bezel by structural engagement or screw locking. Therefore, the fixing component and the adhesive component can stably assemble the display panel with the bezel to increase structural intensity. The circuit board of the camera module is made of plastic material, which has toughness and resilience. The present invention further buckles the camera module with the bezel by resilience of the plastic material, and movement of the camera module relative to the bezel can be fully constrained by assembly of the positioning portion and the corresponding hole.

The bezel of the present invention is slidably connected to the base, dimensions of the constraining portions of the bezel and the base are designed according to volume of the electronic device, so that slide assembly of the first constraining portion and the second constraining portion provides greater engagement tolerance, to effectively prevent the electronic device from damage by the external force. Assembling direction of the bezel relative to the base can be the downward direction illustrated in the above-mentioned embodiment, and further can be the upward direction, the rightward direction and the leftward direction accordingly. Comparing to the prior art, the electronic device of the present invention has advantages of low assembly hours, easy assembly/disassembly function and convenient repair.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device with easy assembly function, the electronic device comprising:
   a bezel defined by a rectangular enclosure, the bezel comprising a first engaging portion and a first wedging portion respectively disposed on different sides of the bezel, the bezel further comprising at least one first constraining portion;
   a display panel disposed on and matched with the bezel and adjacent to the first engaging portion and the first wedging portion, the bezel contacting a surface of the display panel, and a displaying area of the surface of the display panel being exposed via a central opening enclosed by the rectangular enclosure;
   a fixing component, the fixing component comprising:
      a body pressing the display panel to clip the display panel with the bezel;
      a second engaging portion protruding from the body and detachably engaged with the first engaging portion; and
      a second wedging portion protruding from a position of the body different from the second engaging portion and detachably wedged with the first wedging portion; and
   a base independent of the fixing component, the base comprising at least one second constraining portion detachably connected with the at least one first constraining portion to cover the display panel and the fixing component with the bezel.

2. The electronic device of claim 1, wherein the first engaging portion is a sunken slot, the second engaging portion is a protrusion, and the protrusion is rotatably or movably engaged with the sunken slot.

3. The electronic device of claim 1, wherein the first wedging portion comprises a hook and a block, the second wedging portion comprises two open hole structures, the hook is wedged with the corresponding open hole structure to constrain a movement of the body relative to the bezel at a first direction, the block is wedged with the other open hole structure to constrain a movement of the body relative to the bezel at a second direction, and the second direction is different from the first direction.

4. The electronic device of claim 1, wherein the first wedging portion is a slide slot, the second wedging portion is a board structure, the board structure slidably inserts into the slide slot to constrain a movement of the body relative to the bezel at a first direction.

5. The electronic device of claim 1, wherein the body is a single curved structure with a first part and a second part connected to each other, the first part is bent from the second part, the first part and the second part respectively press adjacent edges of the display panel, the second engaging portion is disposed on the first part, and the second wedging portion is disposed on the second part.

6. The electronic device of claim 1, wherein the fixing component further comprises a first lock hole structure disposed on the body, a first external fixing unit is utilized to fix the first lock hole structure on the bezel.

7. The electronic device of claim 6, wherein the body is a dual curved structure with a first part, a second part and a third part respectively pressing corresponding edges of the display panel, the second part and the third part are respectively bent from two ends of the first part, the second engaging portion is disposed on the first part, the second wedging portion is disposed on the second part, and the first lock hole structure is disposed on the third part.

8. The electronic device of claim 1, wherein the first constraining portion slidably inserts into the second constraining portion to assemble the bezel with the base.

9. The electronic device of claim 8, wherein the fixing component further comprises a second lock hole structure disposed on the body, a second external fixing unit is utilized to fix the second lock hole structure on the base.

10. The electronic device of claim 1, wherein the electronic device further comprises a camera module, the bezel further comprises at least two buckling portions buckled with opposite sides of the camera module, the bezel further comprises at least two positioning portions respectively inserting into corresponding holes on the camera module, and an inclined structure is formed on a top of the positioning portion.

11. A computer system comprising:
   an input module; and
   an electronic device electrically connected to the input module in a pivotal manner to receive an input signal from the input module, the electronic device comprising:
      a bezel defined by a rectangular enclosure, the bezel comprising a first engaging portion and a first wedging portion respectively disposed on different sides of the bezel, the bezel further comprising at least one first constraining portion;
      a display panel disposed on and matched with the bezel and adjacent to the first engaging portion and the first wedging portion, the bezel contacting a surface of the display panel, and a displaying area of the surface of the display panel being exposed via a central opening enclosed by the rectangular enclosure;
      a fixing component, the fixing component comprising:
         a body pressing the display panel to clip the display panel with the bezel;

a second engaging portion protruding from the body and detachably engaged with the first engaging portion; and a second wedging portion protruding from a position of the body different from the second engaging portion and detachably wedged with the first wedging portion; and a base independent of the fixing component, the base comprising at least one second constraining portion detachably connected with the at least one first constraining portion to cover the display panel and the fixing component with the bezel.

12. The computer system of claim 11, wherein the first engaging portion is a sunken slot, the second engaging portion is a protrusion, and the protrusion is rotatably or movably engaged with the sunken slot.

13. The computer system of claim 11, wherein the first wedging portion comprises a hook and a block, the second wedging portion comprises two open hole structures, the hook is wedged with the corresponding open hole structure to constrain a movement of the body relative to the bezel at a first direction, the block is wedged with the other open hole structure to constrain a movement of the body relative to the bezel at a second direction, and the second direction is different from the first direction.

14. The computer system of claim 11, wherein the first wedging portion is a slide slot, the second wedging portion is a board structure, the board structure slidably inserts into the slide slot to constrain a movement of the body relative to the bezel at a first direction.

15. The computer system of claim 11, wherein the body is a single curved structure with a first part and a second part connected to each other, the first part is bent from the second part, the first part and the second part respectively press adjacent edges of the display panel, the second engaging portion is disposed on the first part, and the second wedging portion is disposed on the second part.

16. The computer system of claim 11, wherein the fixing component further comprises a first lock hole structure disposed on the body, a first external fixing unit is utilized to fix the first lock hole structure on the bezel.

17. The computer system of claim 16, wherein the body is a dual curved structure with a first part, a second part and a third part respectively pressing corresponding edges of the display panel, the second part and the third part are respectively bent from two ends of the first part, the second engaging portion is disposed on the first part, the second wedging portion is disposed on the second part, and the first lock hole structure is disposed on the third part.

18. The computer system of claim 11, wherein the first constraining portion slidably inserts into the second constraining portion to assemble the bezel with the base.

19. The computer system of claim 18, wherein the fixing component further comprises a second lock hole structure disposed on the body, a second external fixing unit is utilized to fix the second lock hole structure on the base.

20. The computer system of claim 11, wherein the electronic device further comprises a camera module, the bezel further comprises at least two buckling portions buckled with opposite sides of the camera module, the bezel further comprises at least two positioning portions respectively inserting into corresponding holes on the camera module, and an inclined structure is formed on a top of the positioning portion.

* * * * *